W. L. SCRIBNER.
ROLLER BEARING.
APPLICATION FILED MAY 15, 1920.
1,397,297.　　　　　　　Patented Nov. 15, 1921.
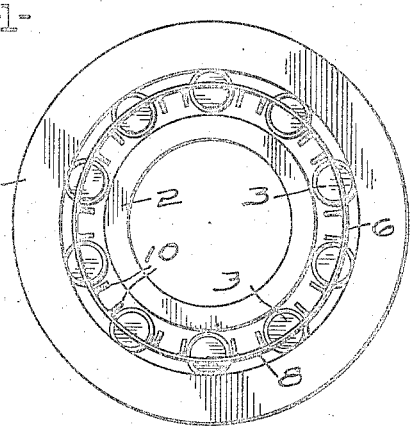
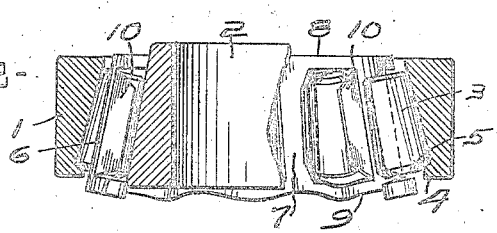
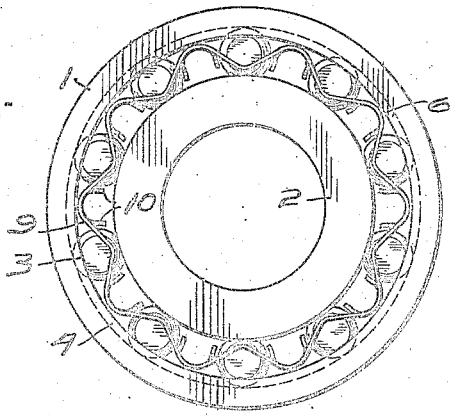
INVENTOR
William L. Scribner.
by
Owen, Owen & Crumpton

UNITED STATES PATENT OFFICE.

WILLIAM L. SCRIBNER, OF TOLEDO, OHIO, ASSIGNOR OF ONE-HALF TO RICHARD T. DAWSON, OF TOLEDO, OHIO.

ROLLER-BEARING.

1,397,297.  Specification of Letters Patent.  Patented Nov. 15, 1921.

Application filed May 15, 1920. Serial No. 381,664.

*To all whom it may concern:*

Be it known that I, WILLIAM L. SCRIBNER, a citizen of the United States, and a resident of Toledo, in the county of Lucas and State of Ohio, have made an Invention Appertaining to Roller-Bearings; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to reduce the wear in roller bearings. It also has for its object to provide in roller bearings a means whereby the rollers and the cup may be assembled and used as a unitary structure, that is, it has for its object to provide a means whereby the rollers are secured within the cup and will be maintained in the cup even though the cone be removed from the rollers. The invention has for its object other advantages which will appear from the following description and upon examination of the drawings.

The invention may be contained in structures of different forms. To illustrate the practical application of my invention I have selected a roller bearing containing the invention and shall describe it hereinafter. The roller bearing selected is illustrated in the accompanying drawings.

Figure 1 of the drawings illustrates an outer end view of the bearing. Fig. 2 illustrates a sectional and a broken view of the bearing, and Fig. 3 illustrates an inner end view of the bearing.

In the figures, 1 is the cup and 2 is the cone between which are located the rollers 3. The cup 1 is provided with the usual conical surface, while the cone 2 is provided with the usual outer conical surface. The rollers 3 are also provided with tapered surfaces, the surfaces of the parts being designed, as far as possible under a certain support and load, to cause the rollers to sustain the load as well as the thrust of the cone and at the same time cause the parts to maintain their proper relative positions. This, however, varies upon variation of the load and the speed of the conical members relative to each other.

The larger diameters of the tapered rollers are at their inner ends and the distance between the conical surface of the cone and the conical surface of the cup is consequently greater at their inner ends than at their outer ends. The result is that when the cone or the cup is traveling or moving relative to the other and particularly when they are carrying a load, the rollers tend to work inwardly, that is, out from between the inner ends or edges of the cone and cup. The rollers are usually confined and this inward relative movement of the rollers prevented by means of a ridge which is located on the inner end of the cone. If then there is any lateral thrust, particularly as that produced in an automobile wheel hub, the ridge of the cone forces against the ends of the rollers and causes an increased pressure and a wear on the corners of the rollers instead of causing the thrust to be sustained by the much larger contact surfaces, namely, the conical surface of the cone and cup and the tapered surfaces of the rollers. In the bearings containing my invention I have provided a cone or male member whose entire contacting surface is an uninterrupted cone which permits the ready separation of the cone or male member from the rollers and the cup and presents only a single cone bearing surface to the rollers. The rollers, however, are retained in position within the cup by the coaction of the ridge 4 which is located on the inner end of the cup 1, that is, on the end having the larger inner diameter. The ridge 4 extends toward the axis at the inner edge of the cone surface of the cup to engage the inner ends of the rollers. The ridge 4, being located on the edge of the cup having the larger diameter, is thus so located that no endwise thrust produced by the lateral pressure or movement of the load is forced upon the ends of the rollers, but the endwise thrust is sustained by the conical surfaces of the cone and cup and rollers. The ridge, however, operates to retain the rollers and cage in their positions with the cup when the cone is withdrawn.

The rollers are also maintained in a definite relation to each other by means of a suitable cage 6. By my invention is provided a means whereby the cup 1, the rollers and the cage may be assembled as a single unitary structure.

The cage 6 is provided with ribs 7 that are connected to the circular ridge 8 and to the sinuous ridge 9, the ridge 9 being formed of elastic metal continuous throughout, that is, formed of entire metal, is expansible or contractible. The ribs have portions that are located within the imaginary cone surface that passes through the axes of the rollers, and which are located in close proximity to the rollers which operate to hold the rollers against the inner surface of the cup. The ribs 7 may be provided with curved flanges 10 that conform substantially to the surfaces of the rollers 3. The rollers 3 may be placed in position between the flanges 10 and then the cup 1 may be placed over the rollers and the cage and forced down upon the rollers, the ridge 4 will press against the lower portions of the tapered surfaces of the rollers and thus compress the contractible ridge 9 until the ridge 4 is forced over the lower ends of the rollers 3, whereupon the ridge 9 will cause the end of the cage to expand and thus hold the rollers within the cup. The entire bearing surface of the cup is a conical surface, the ridge operating to hold the rollers and the cage in position when the cone is withdrawn, and for locating the rollers while the parts are being adjusted. The cone 2 may thus be readily inserted or withdrawn from the rollers. By this arrangement the rollers are protected particularly in shipping and handling the bearings, as they are completely surrounded by the cup and thus marring the surfaces by dropping the rollers against a hard object or in mounting the bearings is avoided. Also injury of the cage is avoided in handling the structures.

The inwardly extending flange or ridge 4 operates also to greatly strengthen the cup portion of the bearing. In bearings well known in the art, the cups spread at the inner end that is, enlarge, due to the wedging action of the thrust of the cones. In such bearings the cups are strengthened by adding metal to the outside of the cup. The ridge 4 does away with this metal so that the cup can be made so as to have a relatively thin wall.

I claim:—

1. In a roller bearing, a plurality of rollers having tapered surfaces, a cup member having a conical bearing surface, a male bearing member located within the rollers, the entire contacting surface of the male bearing member being in the form of an uninterrupted cone surface, an inwardly extending ridge located at the edge of the conical surface of the cup having the larger diameter, the entire contacting surface of the cup, except for the ridge, being the conical surface.

2. In a roller bearing, a plurality of rollers having tapered surfaces, a cup member having a conical surface and an inwardly extending ridge located at the edge of the conical surface having the larger diameter and an elastic contractible and expansible cage having parts thereof engaging the sides of the rollers at points within the cone surface passing through the axes of the rollers for holding the rollers against the inner surface of the cup and for maintaining the rollers in their positions relative to each other, and the ridge of the cup operating to maintain the rollers and the cage within the cup.

In testimony whereof I have, hereunto signed my name to this specification.

WILLIAM L. SCRIBNER.